INVENTOR:
JOHANNES E. RIJNSDORP
BY:
HIS ATTORNEY

INVENTOR:
JOHANNES E. RIJNSDORP
BY: *N N Kunitz*
HIS ATTORNEY 3,342,699
CONTINUOUSLY OPERATING SUPERATMOSPHERIC DISTILLATION PROCESS CONTROL AND APPARATUS THEREFOR
Johannes E. Rijnsdorp, Amsterdam, Netherlands, assignor to Shell Oil Company, New York, N.Y., a corporation of Delaware
Filed Jan. 20, 1964, Ser. No. 338,765
Claims priority, application Netherlands, Feb. 27, 1963, 289,505
12 Claims. (Cl. 203—1)

This invention relates to a method and apparatus for the control of a continuously operating distillation process. More particularly, this invention relates to a method and apparatus for the control of a process for the continuous distillation of a variable stream of an intake mixture (feed) which is carried out at superatmospheric pressure in a multi-tray distillation column having both stripping and rectifying sections; wherein both reflux in the top and re-evaporation in the bottom portion of the distillation column are used; and in which the rate of flow of the intake mixture remains independent of the conditions in the distillation process whereby the operating costs of the process are minimized.

It is a general practice in the industry to provide automatic control for continuous distillation processes. Suitable correcting conditions in this regard are, in general, the amount of reflux, the degree of heat applied in aid of the re-evaporation (to the reboiler), the top product flow (take-off), the bottom product flow (take-off), the degree of cooling in the condenser, and the degree of preheating of the feed. The quality of the products is normally kept constant by controlling these conditions to maintain predetermined temperatures and pressures in the column.

Known control system have their drawbacks since temperature and pressure are not always good criteria for product quality. Furthermore, operating at the predetermined pressures and temperatures which would result in the required quality of the products does not always result in the optimization of the operating costs for the process. With the advent of suitable stream analyzers for prodducing a direct indication of the quality of the process products, it now becomes possible to remove the necessity of controlling the column pressure to a predetermined value. Since the variable costs of operating a distillation process are determined mainly by the cost of preheating the feed together with the cost of heating in aid of re-evaporation, and since the degree of re-evaporation is directly related to the pressure in the column, then if the process is controlled such that the pressure in the column is free to vary within the permissible operating limits of the column and the heat which is supplied to the reboiler is controlled in such a way that the minimum amount of heat need be transferred from the reboiler to the condenser to perfect the desired separation, the variable operating costs for the process can be reduced to a minimum.

As is often the cause in practice, the components to be separated by the distillation have an increasing relative volatility at decreasing pressure. If now, the process is controlled in such a way that the pressure automatically adjusts itself to the lowest value at which the distillation process still produces the desired results, then accordingly as the pressure become lower, less reflex and vapor flow are required to obtain a desired separation. This implies that less heat need be transferred from the reboiler to the condenser to perfect the desired separation which may be obtained by supplying less heat to the reboiler, resulting in a reduction of the variable costs for the process. The basic control scheme for controlling a distillation column in this manner is described in the copending application, Ser. No. 330,753, filed Dec. 19, 1963, by J. E. Rijnsdorp, entitled, "Method and Apparatus for the Control of a Continuously Operating Distillation Process."

It should be noted that the economy of the distillation process usually benefits less from adjustment of the feed preheat than from the pressure being allowed to adjust itself freely. If it is desired to take full advantage of this influence of the preheating and thereby reduce the variable costs to a minimum, it is necessary to ascertain whether the preheating of the feed is provided by a relatively expensive or a relatively cheap source of heat in comparison with the source employed for the re-evaporation. If the cost of the source of heat for preheating the feed is relatively expensive as compared with the cost of the source of heat used for re-evaporation, preheating should be used as little as possible or not at all. On the other hand, if comparatively cheap sources of heat are available for the preheating, then the preheating should be utilized to the fullest to minimize the operating costs for the process. In the control schemes according to the present invention, it is assumed that a relatively cheap source of heat is available for preheating.

The cost of the distillation process can also be reduced by utilizing the column to its maximum extent by providing for the vapor and liquid loads of the trays in the column to be as high as possible. This results in increased production for the column and therefore tends to reduce the cost of distillation per unit of feed. The load of a tray in a distillation column is determined by the liquid flow and vapor flow through that tray. When the feed stream increases the liquid flow and the vapor flow increases, as a result of which the load of the tray also increases. In order that the yield on the capital invested in the plant be as high as possible, it is therefore desirable that the feed stream be also as high as possible, the limit generally being set by the load limit of the trays. According to the invention, the controls for the column required to prevent overloading of the trays are performed automatically while preserving, however, the automatically set minimum values of reflux flow and vapor flow which, at that given feed stream, still afford the desired separation. Thus, it is possible to utilize a feed stream flow which is equal to the maximum permissible value.

It should also be noted that in various operating pressure ranges for the distillation column, the load on the trays of the column may either increase or decrease with increasing pressure. The control schemes according to the invention are for a distillation process operating in a pressure range where the tray load increases with increasing pressure. This is the range where the vapor density has a small influence on the tray load.

Although as pointed out above, the control schemes according to the invention do not maintain the pressure at a predetermined value but rather allow the pressure in the column to freely adjust itself between the maximum and minimum permissible operating pressures for the column, sudden or transient pressure variations in the column may disturb the smooth and orderly control of the distillation process. Accordingly, it is another feature of this invention to provide control for the process whereby sudden pressure variations in the column pressure are suppressed while still allowing the pressure in the column to freely adjust itself.

It is therefore the primary object of this invention to provide a method and apparatus for controlling a process for the continuous distillation of a stream of intake mixture wherein the costs of operating the process are reduced to a minimum.

It is a further object of this invention to provide a method and apparatus of controlling a distillation process for the continuous distillation of a variable stream of intake mixture wherein: the pressure in the column is permitted to freely adjust itself within the permissible limits of the column pressure; the maximum possible quantity of heat is utilized for preheating the feed; and the heat supplied to the distillation process is adjusted to maintain the load on the trays in the distillation column at a value not exceeding their maximum permissible loads whereby the cost of operating the distillation process is minimized when distillation takes place in a pressure range where the tray load increases with increasing pressure and where the cost of the heating medium used for preheating the feed is relatively cheap in comparison with the cost of the heating medium utilized for re-evaporation.

It is still a further object of this invention to provide a method and apparatus for the control of a process for the continuous distillation of an intake mixture containing components having an increasing relative volatility at decreasing pressure wherein: the pressure in the column automatically adjusts itself to the lowest value at which the process produces the desired results; the maximum possible quantity of heat is utilized for preheating the feed; and the heat supplied to the distillation process is adjusted to maintain the load on the trays in the distillation column at a value not exceeding their maximum permissible loads whereby the cost of operating the distillation process is minimized when distillation takes place in a pressure range where the tray load increases with increasing pressure and where the cost of the heating medium used for preheating the feed is relatively cheap in comparison with the cost of the heating medium utilized for re-evaporation.

It is still a further object of this invention to provide a method and apparatus for the control of a process for the continuous distillation of a variable stream of intake mixture wherein: the pressure in the column automatically adjusts itself to the lowest value at which the process still produces the desired results; sudden pressure variations in the column are suppressed; the maximum possible quantity of heat is utilized for preheating the feed; and the heat supplied to the distillation process is adjusted to maintain the load on the trays in the distillation column at a value not exceeding their maximum permissible loads whereby the cost of operating the distillation process is minimized when distillation takes place in a pressure range where the tray load increases with increasing pressure and where the cost of the heating medium used for preheating the feed is relatively cheap in comparison with the cost of the heating medium utilized for re-evaporation.

Briefly, according to the invention, the above objects are obtained by controlling the amount of reflux, the degree of re-evaporation, the top product flow, and the bottom product flow such that the quantity of the top product formed as represented by the level of the top product accumulator, and the quantity of the liquid present in the bottom of the column vary between predetermined acceptable limits and the quality of the separation obtained satisfies the desired requirements. The supply of cooling medium to the top product condenser is then maintained at the maximum quantity which will allow the column to operate at a pressure which is not below the minimum permissible pressure for the column; the quantity of heat utilized in preheating the feed is maintained at the maximum possible value which will allow the column to function properly; and, the loads on the trays of both the rectifying and stripping sections of the column are prevented from exceeding their respective maximum permissible loads.

The pressure in the column is prevented from dropping below the minimum permissible value determined for the column by measuring the pressure in the column and reducing the supply of cooling medium to the condenser whenever the measured pressure drops below the permissible minimum value.

The pressure in the column is likewise prevented from rising above the maximum permissible value determined for the column by decreasing the degree of re-evaporation whenever the measured pressure rises above the maximum permissible value.

The load of the trays of the stripping section of the column is prevented from rising above the maximum permissible load for the trays by decreasing the degree of re-evaporation whenever the measured load of one or more rectifying section trays rises above the maximum permissible value. The result of this correcting action is that the vapor production in the column and particularly in the stripping section is decreased, resulting in a decrease in the tray load on the stripping section trays.

The load on the trays of the rectifying section of the column is prevented from rising above the maximum permissible load for the trays by decreasing the quantity of heat utilized for preheating and, as shown in some of the embodiments, the degree of re-evaporation whenever the maximum permissible load of one or more trays of the rectifying section is exceeded. The result of this correcting action is that the vapor production in the column and particularly in the rectifying section is decreased, resulting in a decrease in the tray load of the rectifying section trays.

The objects and advantages of the present invention will be understood from the following description taken with reference to the attached drawings wherein.

Figure 1:
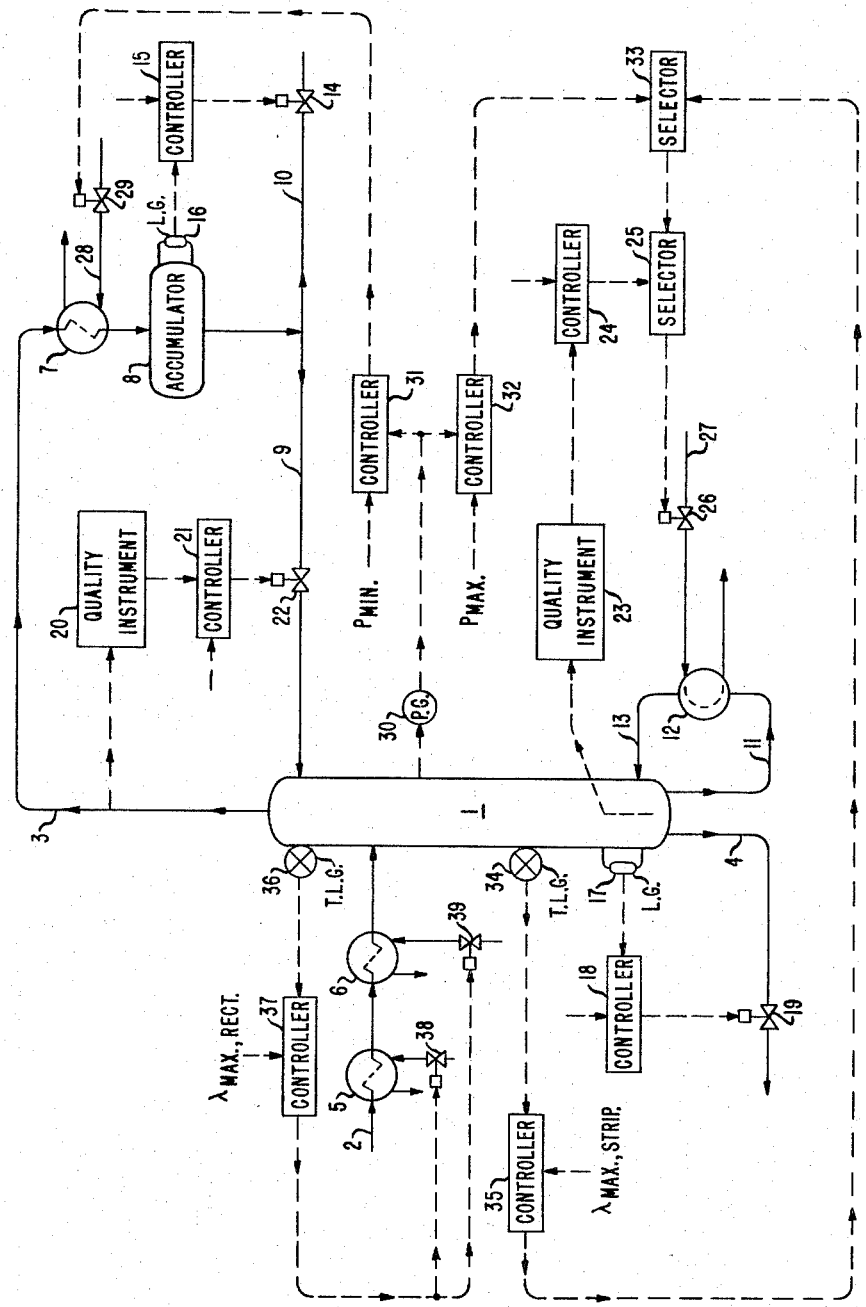
FIGURE 1 is a diagrammatic representation of the basic control scheme according to the invention.

Referring now to the drawings, wherein like reference numerals in each of the figures refer to the same structure, FIGURE 1 is a diagrammatic representation of the basic control scheme according to the invention for a multi-tray distillation column 1 which contains both a rectifying section and a stripping section and operates at a pressure above atmospheric. The feed or intake mixture is continually introduced in either a liquid or vapor form into the column 1 to an intermediate stage through a pipeline 2; the top product in the vapor phase is discharged through a pipeline 3; and the liquid bottom product is discharged through a pipeline 4. Coupled to the feed pipeline 2 is a plurality of heat exchangers 5 and 6 for preheating the feed. Although it is possible to only use one heat exchanger to preheat the feed, as often occurs in practice, more than one source of heat is available and therefore a plurality of heat exchangers, as shown, would be required.

Connected to the top product column discharge line 3 is a condenser 7 which condenses the vapor in the line 3; the condensate then flows into an accumulator 8. A part of the condensate from the accumulator 8 is returned to the top of the column 1 for reflux by a pipeline 9, while the liquid top product output is discharged from the accumulator via a discharge pipeline 10.

Re-evaporation for the column 1 is effected by passing a stream of liquid from the bottom of the column via a pipeline 11 to a reboiler 12 which may, for example, be a heat exchanger, and returning the heated stream via a pipeline 13 to the column 1. The particular manner in which re-evaporation is attained, however, forms per se no part of this invention since re-evaporation may be accomplished in other ways, e.g., with a heating coil in the bottom of the column.

Before discussing the particular control of the process, a distinction must be made between, inter alia, controlled conditions and correcting conditions. The controlled conditions are those variables in the process which are controlled in such a way that in general the difference between the measured value of the variable and the set or desired value of this variable is decreased. This is accomplished by adjusting other variables or correcting conditions of the process. In the present case, the amount of reflux, the degree of re-evaporation, the rate of top product flow, the rate of bottom product flow, the degree of cooling in the condenser, and the degree of preheating of the feed are suitable as correcting conditions. Of these correcting conditions, four, namely, the reflux, the re-evaporation, and the top and bottom product flow, are adjusted in dependence on the following four controlled conditions: the quality of the top product, the quality of the bottom product, the top product accumulator level, and the bottom level, i.e., the liquid level in the bottom of column 1. The remaining two correcting conditions, i.e., the degree of cooling in the condenser and the degree of pre-heating are adjusted to the maximum values which will permit the process to function properly.

It should be noted that the present process is conceived as a distillation process in which the feed rate may vary independently of the other conditions in the distillation process, that is, the distillation process should function properly regardless of the quantity of feed supplied. Processes of this type frequently occur in oil refineries where the feed to be distilled often originates from another part of the refinery and storage tanks for this feed are not available or cannot be used. The feed stream can, however, be controlled to a constant or substantially constant value, for example, when storage tanks are available, without requiring any change in the control schemes forming this invention.

As shown in FIGURE 1, the top product flow is adjusted by means of a controllable valve 14 connected in the pipeline 10. The valve 14 is controlled by means of a controller 15 which compares the measured value of the level in the accumulator 8, as determined by the level gauge 16, with a signal proportional to the desired level in the accumulator, i.e., the set value of the controller. Any differences resulting from the comparison produces an output signal from the controller 15 which tends to adjust the valve 14 in such a way that the difference is decreased. Thus, if at a given moment, the measured value of the accumulator level is larger than the set or desired value, the signal supplied from the controller 15 tends to open the valve 14 wider. In a similar manner, the bottom level is maintained at the desired value with the aid of a level gauge 17, a controller 18, and a control valve 19 in the pipeline 4.

The amount of reflux for the column 1 is controlled by means of a quality measuring instrument or meter 20 which analyzes the quality of the top products flowing through the pipeline 3 and transmits a signal corresponding to the separation to a controller 21 wherein the measured and desired quality of the top product are compared. The output signal from the controller 21 is coupled to a control valve 22 in the pipeline 9. If the measured quality is too low, the output signal from the controller 21 tends to open the valve 22 wider and thus increase the amount of reflux; the reverse occurs if the measured quality proves to be too high.

The degree of re-evaporation necessary to attain the desired separation in the distillation column is controlled by means of a quality instrument 23 which measures the quality of the bottom product and transmits a signal corresponding to the separation obtained to a controller 24 wherein the measured and desired values of the quality of the bottom products are compared. The output signal from the controller 24 is coupled via a signal selector 25, which will be more fully explained below, to a control valve 26 which is located in the heating medium supply line 27 for the reboiler 12. If at a given moment the quality of separation is too low, the valve 26 is opened wider; thereby increasing the degree of re-evaporation. The reverse occurs if the measured quality appears to be too high.

The cooling medium for the condenser 7 is supplied through a pipeline 28 having a control valve 29 connected therein. In order to allow the pressure in the column 1 to reach the lowest possible value at which the process will operate satisfactorily, the control valve 29 is normally open as wide as possible. With the embodiment chosen in this example, the valve is opened as wide as possible if the signal supplied is at a minimum value.

In order to insure that the pressure within the column does not vary outside of the permissible pressure range for the column, the pressure in the column is measured by means of a gauge 30 which is coupled to a pair of controllers 31 and 32. The controller 31 compares the value of the measured pressure with a value corresponding to the minimum permissible operation pressure ($P_{min}$) for the column. As long as the pressure in the column is not less than $P_{min}$, the output signal from the controller 31 is at a minimum and valve 29 remains open to the maximum extent. Should the pressure in the column become lower than $P_{min}$, controller 31 produces an output signal which closes valve 29 an amount sufficient to bring the pressure within the column approximately equal to $P_{min}$. Controller 32 compares the value of the measured pressure with the desired value corresponding to the maximum permissible pressure ($P_{max}$) for the column. As long as the pressure in the column is not greater than $P_{max}$, the output signal from controller 32 is maintained at a maximum value. This output signal is transmitted via a signal selector 33 to the selector 25 to which is also connected, as mentioned above, the output signal from controller 24. Each of the selectors 25 and 33 produces an output signal equal to the lowest value of its respective two input signals. Since under normal operating conditions the pressure in the column is lower than $P_{max}$, the output signal from the controller 32 is maintained at its maximum value; the result is that any output signal from selector 33 which is due to a signal from the controller 32 is larger than the output signal from controller 24, causing selector 25 to transmit the output signal from the controller 24 to the valve 26 to control the quality of the separation. Should the pressure in the column become higher than $P_{max}$, however, the output signal from the controller 32 then becomes smaller in value until it is transmitted by selector 25 to the valve 26 in lieu of the signal from the controller 24; this causes the valve 26 to be closed an amount sufficient to bring the pressure in the column approximately equal to $P_{max}$. It should be noted that for practical reasons it is recommendable to allow for a small safety margin in the set values of the controllers 31 and 32, i.e., the set values should be set at values corresponding to pressures respectively slightly above the minimum and slightly below the maximum pressures for the column.

The amount of heat supplied to the reboiler 12 is also adjusted, as hereinbefore indicated, in response to the load on the trays in the stripping section of the column 1, i.e., the amount of heat supplied to the reboiler 12 is decreased whenever the maximum tray load for the stripping section trays is exceeded. As shown in the figure, the load of the trays in the stripping section is measured with a tray load gauge 34. The output signal from the gauge 34 is connected to a controller 35 which compares this signal with a set value corresponding to the maximum permissible stripping section tray load ($\lambda_{max\ strip}$). The output signal from controller 35, which is maintained at a maximum value as long as the load of the trays in the stripping section does not exceed $\lambda_{max\ strip}$ provides the second input for the signal selector 33. Assuming that the column is operating in the permissible pressure operating range, as long as the load on the stripping section trays does not exceed $\lambda_{max\ strip}$, the output signal from controller 35 and consequently selector 33 is at a maximum value; resulting, as explained above, in the selector 25 passing the output signal from controller 24 to the valve 26. Should the load become larger than $\lambda_{max\ strip}$, the output signal from controller 35 becomes smaller, as a result of which selectors 33 and 25 will pass this output signal to valve 26 to further close the valve until the measured load has decreased to approximately $\lambda_{max\ strip}$. It should be noted that the order of the connections of the controllers 24, 32 and 35 to the selectors 25 and 33 can be permuted.

In order to insure that the maximum load of the trays in the rectifying section of the column 1 is not exceeded, the load of the trays in this section is measured by means of a tray load gauge 36. The output signal from gauge 36 is connected to a controller 37 which compares the measured value of the tray load with a set value corresponding to the maximum permissible rectifying section tray load, $\lambda_{max\ rect}$. The output signal from the controller 37, which is maintained at a maximum value so long as the load on the trays of the rectifying section does not exceed $\lambda_{max\ rect}$, is connected to a pair of control valves 38 and 39 which control the quantity of heat supplied to the preheaters 5 and 6, respectively. Since in the present control scheme, it is assumed that the cost of heat used for the preheating is relatively cheap, and that therefore the maximum possible quantity of heat should be supplied to the preheaters 5 and 6, the valves 38 and 39 are normally maintained in their maximum open position. This position is maintained when the signal supplied to the control valves is at a maximum value. As long as the load on the trays in the rectifying section does not exceed $\lambda_{max\ rect}$, the output signal from the controller 37 is at a maximum value and the control valves 38 and 39 are maintained in the maximum open condition. If the load becomes larger than $\lambda_{max\ rect}$, the output signal from controller 37 becomes smaller, as a result of which the valves 38 and 39 are further closed until the load on the trays of the rectifying section becomes approximately equal to $\lambda_{max\ rect}$.

As shown in the figure, the control valves 38 and 39 are adjusted simultaneously by the output signal from the controller 37. Such a control scheme operates satisfactorily if the same heating medium is supplied to both preheaters or if two different heating mediums are supplied to the preheaters 5 and 6, the costs of the two heating mediums being equal. In the event, however, that the costs of the two different heating mediums are unequal, then in order to minimize the operating costs of the distillation process, the control of the respective preheaters 5 and 6 should be controlled, in any well known manner, in such a way that the supply of the most expensive heating medium is decreased first.

In determining the value of the maximum permissible load for the trays, it is not only necessary to pay attention to the dimension of the trays, but also the influences of the dynamics of the system and the clearances in part of the tray should be taken into account. This results in the set value of the maximum permissible tray load of the controllers being slightly lower than the maximum value specified for the trays.

Figure 2:
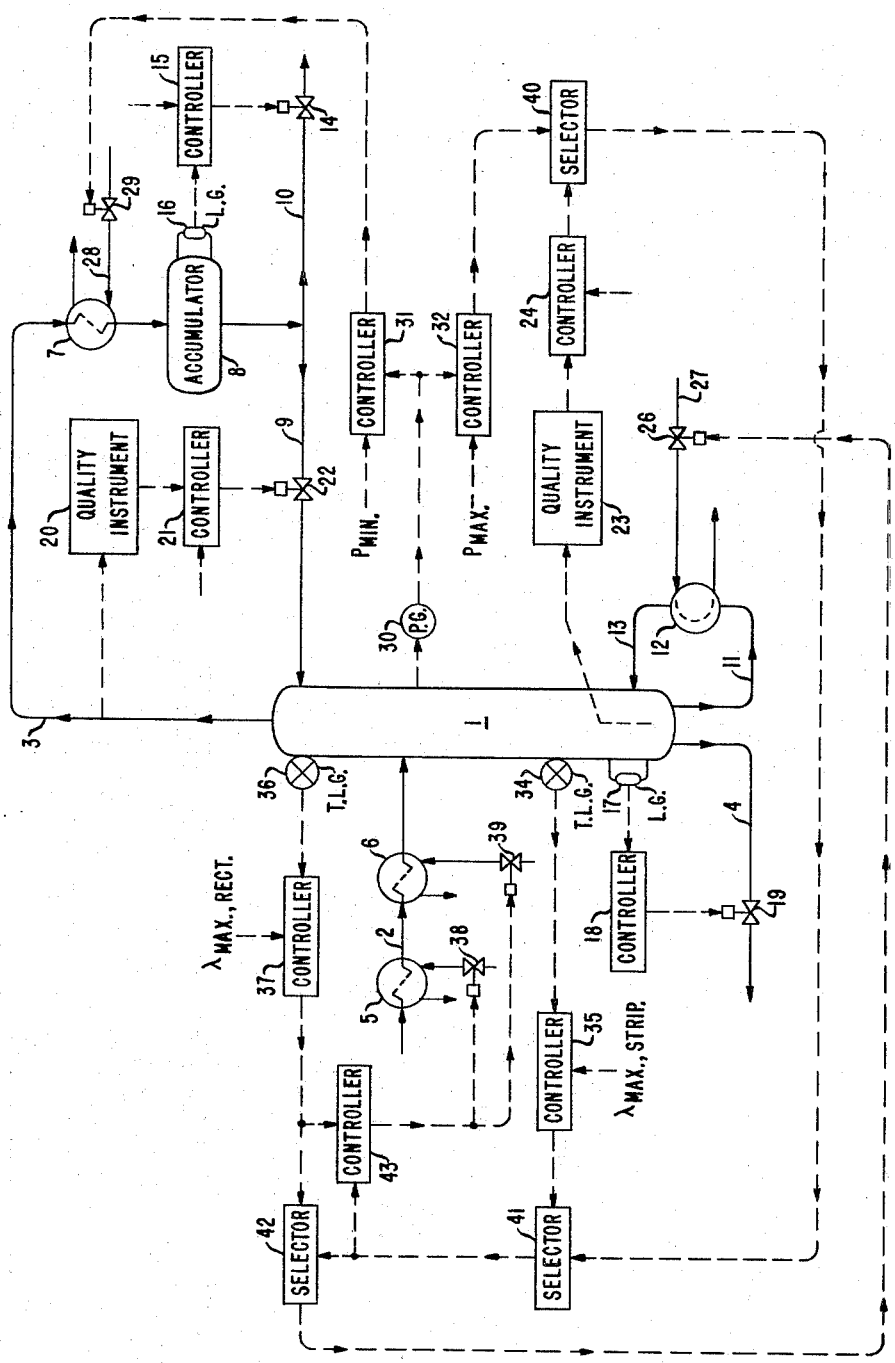
FIGURE 2 is a diagrammatic representation of a modification of the basic control scheme wherein overloading of the trays of the rectifying section is eliminated by simultaneously adjusting the degree of preheating and the degree of re-evaporation.

Referring now to FIGURE 2, there is shown a mode of control which is particularly advantageous in the case of rapid and large variations in the load of the trays in the rectifying section. With this mode of control, the decrease of the vapor load in the rectifying section is now initiated by two simultaneously occurring correcting actions, i.e., via the feed preheaters and via the reboiler. As shown in the figure, the output signal from the quality controller 24 and the maximum pressure pressure controller 32 are connected to the inputs of a signal selector 40. In a manner corresponding to that already discussed for the selectors 25 and 33 above, selector 40 passes the input signal having the lowest value. This output signal is then passed through a selector 41 which compares this signal with the output signal from the stripping section load controller 35. The selector 41 again passes the signal with the lowest value to another selector 42 which compares this signal with the output signal from the rectifying section load controller 37. The input signal to the selector 42 having the lowest value is then utilized to control the control valve 26 to adjust the quantity of heat supplied to the reboiler 12. As can be readily seen, with this type of connection, if the maximum loads on the trays of the stripping and rectifying sections of the column are not exceeded and if the column is operating at a pressure not in excess of the maximum permissible pressure for the column, the output signals from controllers 32, 35 and 37 are maintained at their respective maximum values and consequently the selectors 40–42 pass the signal from the quality controller 24 to the valve 26. Should any of the controllers 32, 35 and 37 produce an output signal indicating that a maximum condition has been exceeded, then the output signal from the particular controller indicating such a condition is transmitted via the signal selectors to the control valve 26 to decrease the quantity of heat supplied to the reboiler 12 until the exceeded maximum condition has been alleviated. It should be noted that as in the case of FIGURE 1, the connections of the controllers 24, 32 and 35 to the selectors 40 and 41 can be permuted.

The output signal from the controller 37 is also connected to one input of a controller 43 which compares this signal to the output signal of selector 41. The controller 43, the output of which is utilized to control the control valves 38 and 39, produces a maximum output signal so long as the output signal from controller 37 is at a maximum value, and thereby maintains the control valves 38 and 39 at their maximum open positions as long as the tray load does not exceed the maximum permissible value. In the event that the output signal from controller 37 is less than that from selector 41, thereby indicating that the maximum tray load for the rectifying section has been exceeded, the output signal from controller 43 will further close the valves 38 and 39 until the two signals reaching controller 43 become equal. This correcting action decreases the degree of preheating of the feed, resulting in the load on the trays in the rectifying section being decreased below the maximum permissible load while at the time maintaining the proper quantity of heat to the control system to produce the desired quality of the bottom product.

Figure 3:
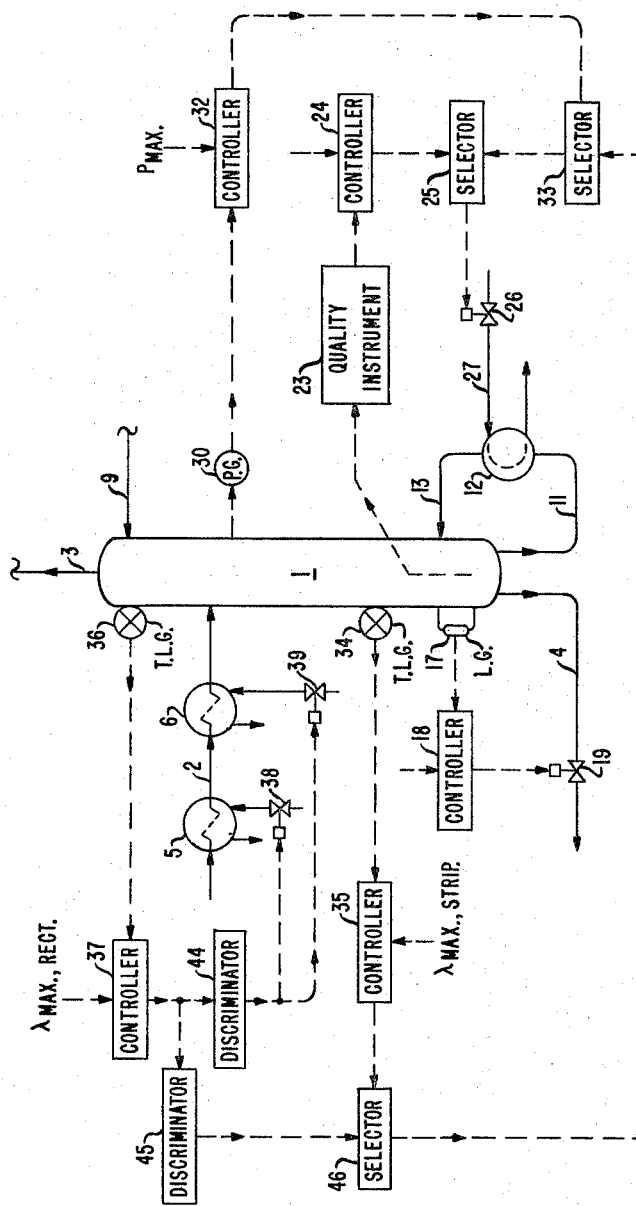
FIGURES 3–5 are modifications of the basic control scheme wherein overloading of the trays of the rectifying section of the column is eliminated by sequentially decreasing the degree of preheating and the degree of re-evaporation.

Referring now to FIGURE 3, there is shown a control scheme to alleviate overloading of the trays in the rectifying section by decreasing the supply of heat to the column succesively via the preheater and the reboiler. Such a control scheme is of particular importance when, due to large variations in the load of the trays in the rectifying section, the load of these trays cannot be reduced below the maximum permissible load by merely decreasing the degree of preheating of the feed, i.e., the load of the trays of the rectifying section of the column is not reduced below their maximum permissible loads even when the feed preheaters are completely switched off. According to this control scheme, the output signal from the controller 37 is passed through a pair of signal amplitude discriminators 44 and 45. The discriminator 44 passes the signal from the controller 37 to the control valves 38 and 39 so long as the signal from controller 37 is between its maximum value and a predetermined intermediate value of the signal which preferably corresponds to that value of the output signal of controller 37 at which the valves 38 and 39 are completely closed. The discriminator 45 is set to pass a value corresponding to the maximum output signal from the controller 37 to a selector 46 during the time that discriminator 44 is passing the output signals from controller 37 to the control valves 38 and 39. Once the output signal from controller 37 has decreased in value below the predetermined intermediate value mentioned above, the discriminator 45 then directly passes the output signal from the controller 37 to the selector 46.

To the second input of the signal selector 46, which produces an output signal equal to the lesser of its two input signals, is connected the output from the stripping section controller 35; the output signal from the signal selector 46 being utilized to adjust the control valve 25 via the signal selectors 33 and 25 as explained above with respect to FIGURE 1. With this control scheme, as long as the load on the trays in the rectifying section of the column does not exceed the maximum permissible load for the trays, the output signal from controller 37 is at a maximum value, and hence is passed, via the discriminator 44, to the control valves 38 and 39 to maintain them at their maximum open positions. Should the maximum load on the trays in the rectifying section of the column be exceeded however, the output signal from controller 37 begins to decrease and is then passed via the discriminator 44 to the control valves 38 and 39 to further close these valves, thereby decreasing the quantity of heat supplied for preheating. The controller 37 continues to try to reduce the overload on the rectifying section trays via the control valves 38 and 39 until the output signal from the controller 37 has reached the preset intermediate value indicating that the control valves 38 and 39 are completely closed. At this time, if the output signal from the controller 37 is still decreasing, indicating that an overload of the rectifying section trays still exists, the output signal from controller 37 is passed via the discriminator 45 and the selectors 46, 33 and 25 to the control valve 26 to reduce the amount of heat supplied to the reboiler 12, and thereby reduce the overload on the rectifying section trays. It should be noted that during the time the output signal from the controller 37 is being passed by the discriminator 44, the discriminator 45 is passing a maximum output signal and hence does not effect the position of control valve 26. Although the control scheme has been described for complete sequential operation, it is possible by proper selection of the range of operation of the discriminators 44 and 45 to institute control via the control valve 26 at any desired point. Furthermore, it should be noted that the function of the discriminators 44 and 45 can be performed by valve positioners interconnecting the valves 38 and 39 to the valve 26. Obviously, if such valve positioners are utilized, the discriminators 44 and 45 may be eliminated. As with the preceding figures, the connection of the controllers 24, 32 and 35 and of the discriminator 45 to the selectors 25, 33 and 46 can be permuted.

Figure 4:
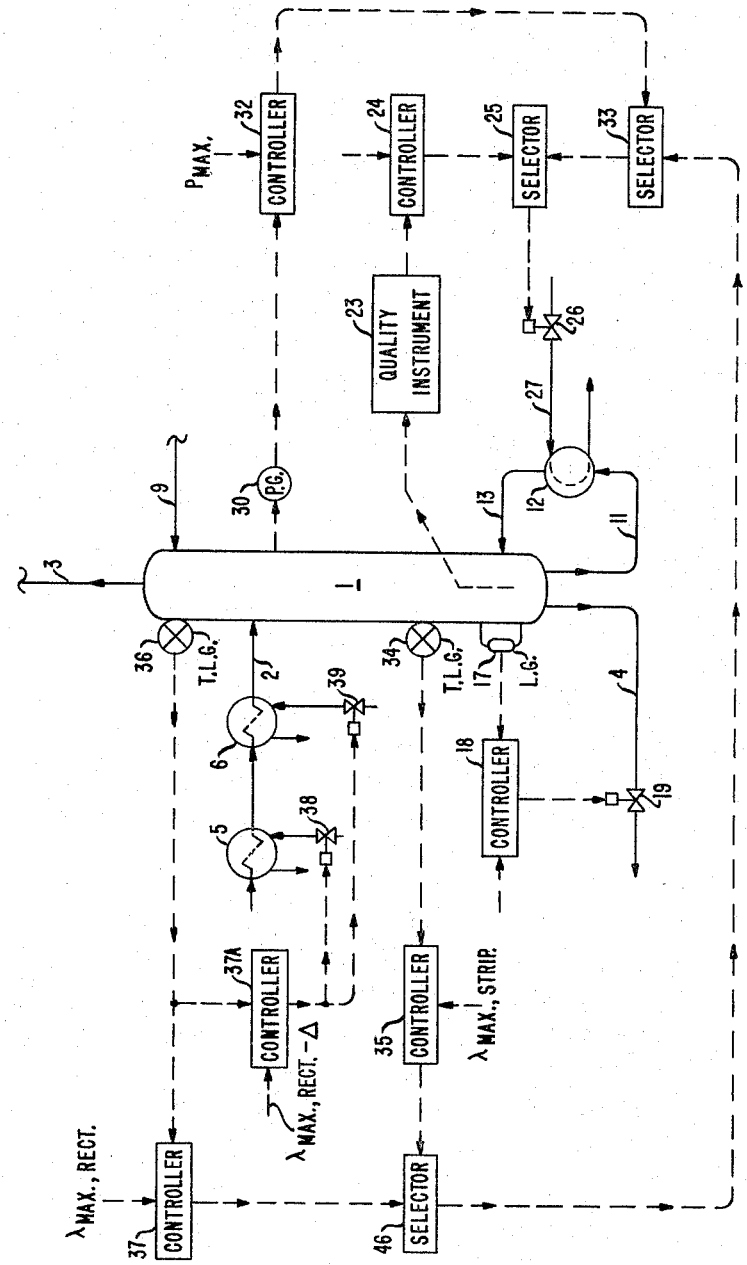

Referring now to FIGURE 4, there is shown an alternative control scheme for the mode of control represented by FIGURE 3. According to this control scheme, the signal from the rectifying section tray load gauge 36 is passed to the controller 37 and to a second controller 37A. The set value of the controller 37 corresponds to the maximum permissible value of the load for the trays of the rectifying section while the set value for the controller 37A is slightly lower than that of the controller 37. The controller 37 compares the output signal from the gauge 36 with the maximum permissible load for the rectifying section trays, $\lambda_{max\ rect}$, and produces a maximum output signal as long as the measured load does not exceed $\lambda_{max\ rect}$. The output signal from the controller 37A is maintained at a maximum value as long as the gauge 36 is not measuring any value larger than $\lambda_{max\ rect} - \Delta$, that is, a slightly smaller value than $\lambda_{max\ rect}$. With this control scheme, the output signal from the controller 37A, which controls the positioning of the control valves 38 and 39, begins to decrease at an earlier moment in time than the output signal from the controller 37 as the load on the trays in the rectifying section approaches $\lambda_{max\ rect}$; thereby beginning to close the valves 38 and 39 at an earlier moment than that at which the valve 26 begins to close. The result of this action is that with increasing tray load, the degree of preheating of the feed is already decreasing just a moment before $\lambda_{max\ rect}$ is reached. If this prior reduction of the degree of preheating of the feed is still inadequate to maintain the load on the rectifying section trays below $\lambda_{max\ rect}$ then, the control valve 26 is additionaly further closed via the controller 37. This mode of control performs particularly favorably when variations of the load occur rapidly. It should be noted that as with the previous control schemes, the connection of the controllers 24 and 32 and 35 to the selectors 25, 33 and 46 can be permuted.

Figure 5:
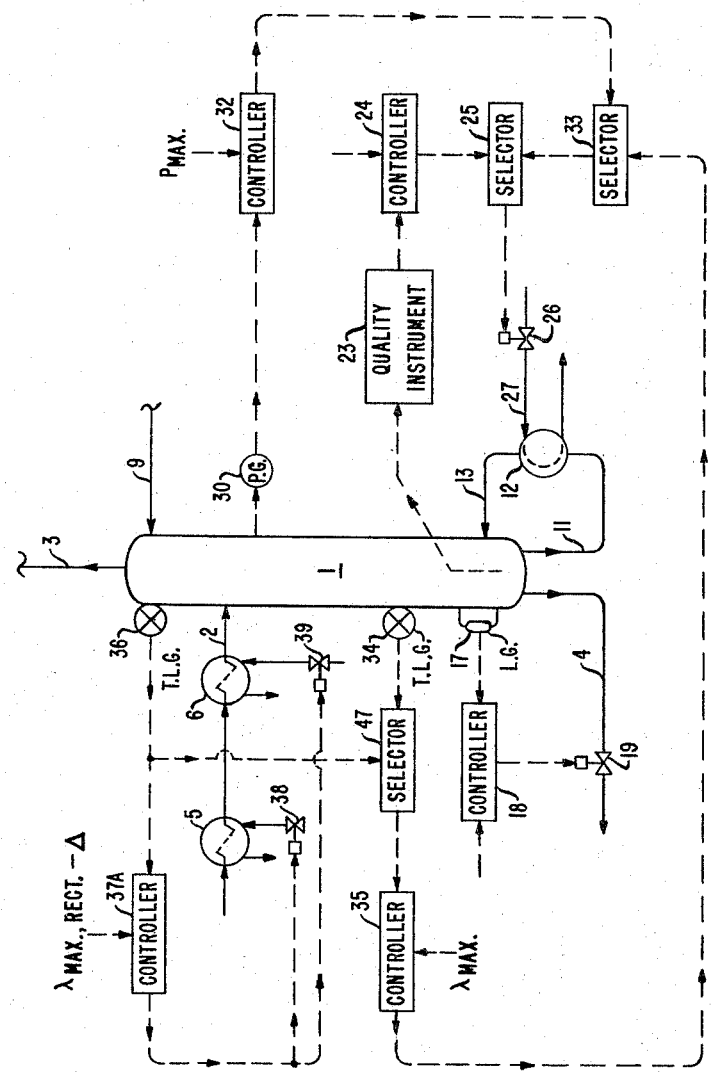

A similar result to that reached with the control schemes shown in FIGURES 3 and 4 is reached with the mode of control according to FIGURE 5. When utilizing the control scheme of FIGURE 5 the tray load gauges 34 and 36 are adjusted such that their output signals are equal when the largest permissible tray loads in the two sections of the column are reached, i.e. the values of $\lambda_{max\ strip}$ and $\lambda_{max\ rect}$ are equal ($\lambda_{max}$). The output signal from the tray load gauge 36 is connected both to the controller 37A and to a signal selector 47 which is connected between the tray load gauge 34 and the controller 35. As opposed to the signal selectors described in the aforementioned control schemes, the signal selector 47 produces an output signal equal to the maximum value of its two input signals, and therefore, transmits a signal corresponding to the largest tray load to the controller 35. If the value of the tray load in the rectifying section measured by the gauge 36 becomes larger than $\lambda_{max\ rect} - \Delta$, the output signal from the controller 37A causes the valves 38 and 39 to be further closed. If the closure of the valves 38 and 39 does not have the desired effect of stopping the increase in the load on the trays in the rectifying section, then as the load on the trays in the recitifying section continues to increase, the output signal from tray gauge 36 also continues to increase until it reaches a value equal to $\lambda_{max}$, the set value of controller 35. As soon as the input signal to controller 35 from signal selector 47 exceeds $\lambda_{max}$, the output signal from controller 35 begins to decrease and close the control valve 26 via the signal selectors 33 and 25 as explained above. In a similar manner, if the maximum permissible load for the trays in the stripping section of the column is exceeded, the output signal from tray guage 34 causes the controller 35 to vary the position of the control valve 26 to decrease the load on the stripping section trays. It should again be noted, that the order of connecting the controllers 24, 32 and 35 to the selectors 25 and 33 can be permuted.

Although with the mode of control according to the invention, the value of the pressure in the column is not controlled to a predetermined value but is merely held within a wide range within which it can vary, it is often desirable to suppress rapid pressure fluctuations in the column. Preferably this suppression of the rapid pressure fluctuations in the column is attained by means of a controller which sets the degree of condenser cooling.

Figure 6:
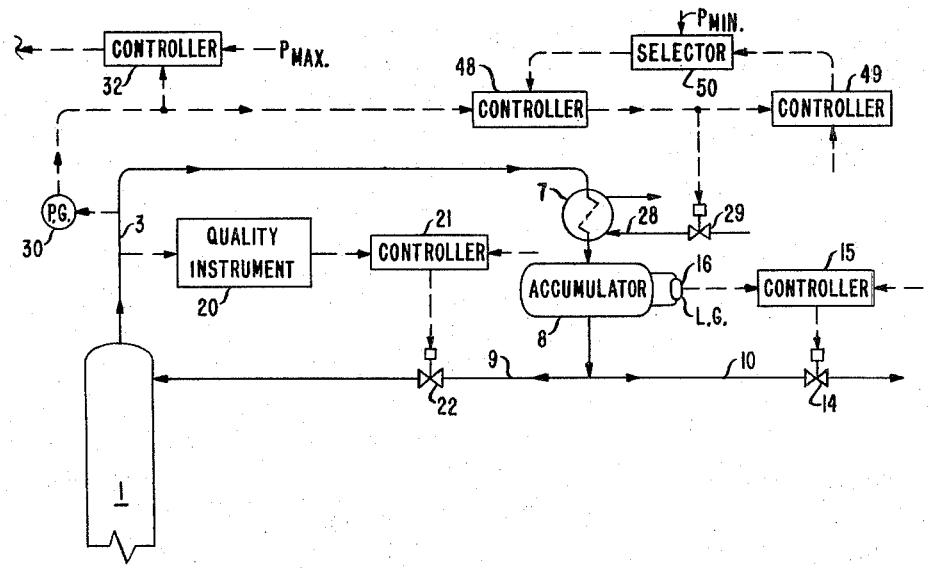
FIGURES 6–8 are diagrammatic representations of modifications of portions of the control schemes shown in the preceeding figures for suppressing sudden pressure variations in the column.

Referring now to FIGURE 6, there is shown the preferred modification of the basic control scheme wherein sudden pressure variations are suppressed via the control valve 29 for the supply of cooling medium to the condenser 7. In this modification, the pressure gauge 30, which here is connected to the pipeline 3 but which alternatively may be connected directly to any level of the column 1, supplies one input signal to a controller 48, the second or set input of which is obtained from a controller 49. The output of controller 48, which controls the positin of the valve 29, is also fed to the input of controller 49. The controller 49 compares the output signal from the controller 48 with a set value corresponding to that value of the output signal of controller 48 at which the control valve 29 is almost fully open. Connected between the output of controller 49 and the input of controller 48 is a signal selector 50 to which is supplied a signal coresponding to the minimum permissible operating pressure for the column, $P_{min}$. The selector 50 produces an output signal equal to the highest value of its two input signals and thereby prevents the output signal from the controller 49 from attaining a value smaller than $P_{min}$. The controller 49 aims at minimizing the difference between its set value and its input signal from controller 48 by continuously adjusting the output of controller 48 until the latter has attained a value corresponding to that at which the control valve 29 is almost fully open. If a rapid pressure variation should occur in the column, the controller 48 then supplies an output signal which is different from the desired signal, resulting in the valve 29 being either further opened or further closed depending on whether the pressure rose or fell, and thereby counteracting the sudden pressure variation in the column. As soon as the disturbance is over, the controllers 48 and 49 return the valve 29 to the desired position.

Figure 7:
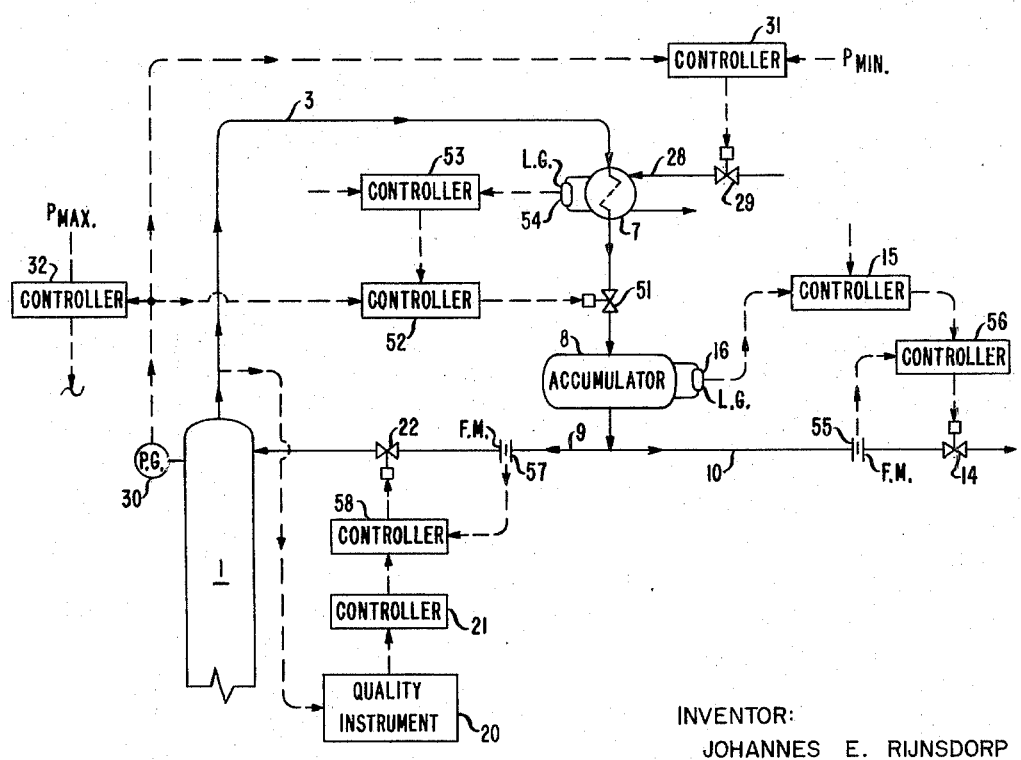

It is also possible to suppress sudden pressure variations by controlling the level of the condensate in the condenser 7. As shown in FIGURE 7, a control valve 51 is located in the condensed vapor line between the condenser 7 and the accumulator 8. This control valve is operated by a controller 52 which compares the signal from the pressure gauge 30 with a signal from a controller 53 which receives an input signal from a condensate level gauge 54 connected to the condenser 7. Since a low condensate level in the condenser 7 results in operation of the condenser at almost maximum capacity and thereby tends to produce a low pressure in the column, the second input or set value of the controller 53 corresponds to an almost minimum value of condensate level in the condenser 7. If a sudden rise in the pressure in column 1 should occur, the increased output signal from the pressure gauge 30 causes the controller 52 to open the valve 51 a little wider to reduce the level of the condensate in condenser 7; this increases the cooling capacity of condenser 7 and results in a counteraction and thereby a suppression of the sudden pressure rise. Only when the sudden pressure fluctuation has ended and the level in the condenser 7 has had time to fall, does the level gauge 54 emit a signal indicating a reduced level; the controller 53 then restores the condenser to its normal operating condition. This may occur without an immediate change in the signal from the gauge 30, i.e., the column pressure is not held at a fixed level, but is only held above the level $P_{min}$ by the controller 31. Conversely, a sudden pressure drop in the column 1 results in the controller 52 further closing the valve 51. On the other hand, upon a very gradual change in the signal from the gauge 30, any change in the position of the valve 51 due to a pressure change is soon counteracted by the controller 53.

In the embodiment shown in FIGURE 7, the top product output flow is controlled by means of a flow meter 55 connected to the pipeline 10 and a controller 56, while the reflux flow is controlled by means of a flow meter 57 connected to the pipeline 9 and a controller 58. The controller 56 compares the output signal from the flow meter 55 and the output signal from the accumulator level controller 15 in a manner which tends to keep the top product flow at a constant value. However, when the level of the liquid in the accumulator 8 changes, the output of the controller 15 will reflect this change and cause the controller 56 to open further the valve 14 in response to a rise in the level of the condensate in accumulator 8 and further close the valve 14 for a drop in the condensate level in the accumulator. The controller 58, which attempts to keep the reflux flow constant, compares the output signal from the flow meter 57 and the output signal from the top product quality controller 21. If the quality of the top product should change, the output signal from the controller 21 will cause the controller 58 to open further the valve 22 if the quality of the top product is below specification and further close the valve 22 if the quality is above the desired specification.

Figure 8:
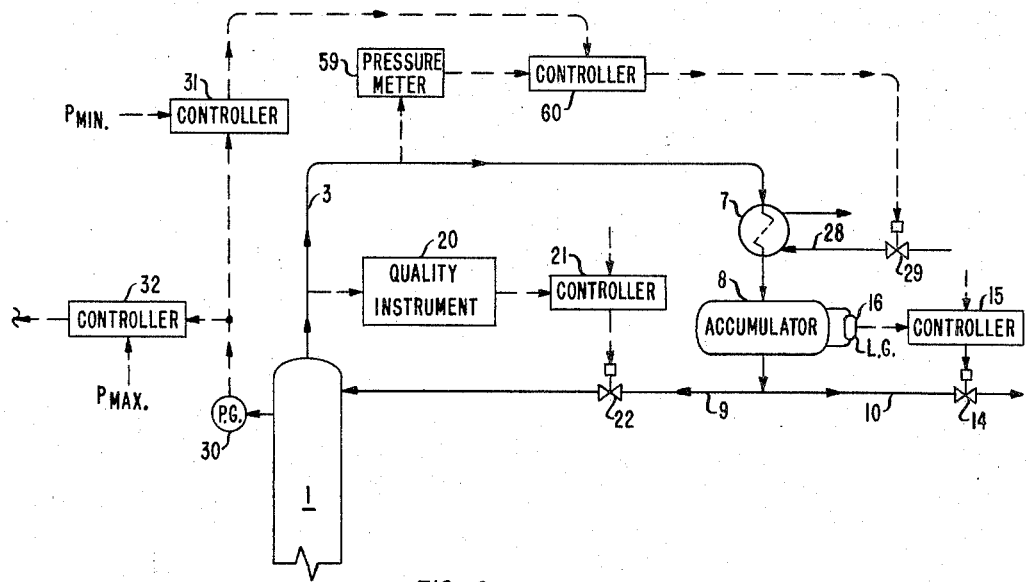

Referring now to FIGURE 8, there is shown a modification of the basic control scheme wherein sudden pressure variations are suppressed by means of a meter 59 which produces an output signal proportional to the rate of pressure variation in the column 1. The output signal from the meter 59 is supplied to a controller 60 which compares this signal with a set value corresponding to the maximum open position of the coolant flow control valve 29 which will maintain the pressure in the column within the permissible operating pressure range for the column. This second signal to the controller 60 is supplied by the controller 31 which, as in the preceeding figures, must prevent the pressure in the column from becoming smaller than $P_{min}$ and emits a minimum value control signal as long as the signal from the gauge 20 indicates that the pressure in the column is above $P_{min}$. In the absence of any sudden pressure variations in the column, the controller 60 maintains the control valve 29 at a position corresponding to the output signal from controller 31. In the event of a sudden pressure variation in the column 1, the output signal from the meter 59 causes the controller 60 to open further or close further the valve 29, depending on whether the pressure increased or decreased. As soon as the pressure disturbance is over, the controller 60 again returns the valve 29 to the position corresponding to the value of the output signal from controller 31, i.e., an almost fully open position.

For further illustration of the method and apparatus for control according to the invention, some additional embodiments are presented here, which give alternatives to the embodiments already presented; it being understood that these do not exhaust the possibilities of actually carrying out the process according to the invention.

Figure 9:
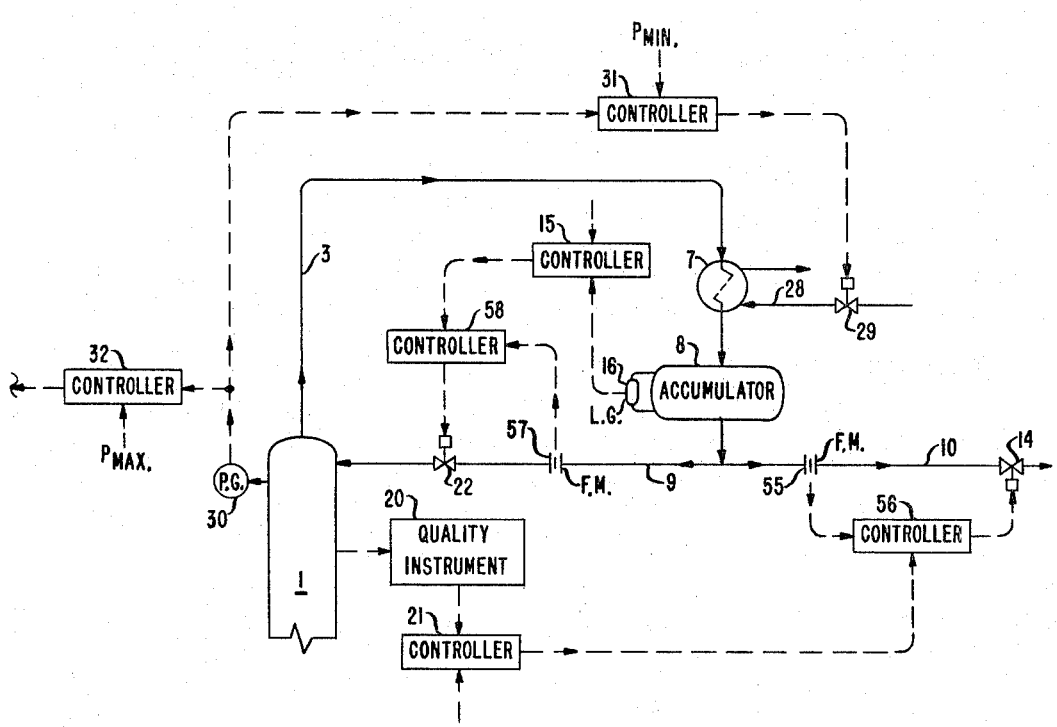
FIGURE 9 is a diagrammatic representation indicating alternative control schemes for various portions of the control schemes of the preceeding figures.

The control of the accumulator level and of the quality of the top product may take place according to the scheme of FIGURE 9. In this embodiment, the quality instrument 20 and the controller 21 provide the set value for the controller 56 which compares this signal with the signal from the top product discharge flow meter 55. The valve 14 is then adjusted by the controller 56 such that the top product meets the quality specification. The reflux rate obviously increases as the valve 14 is further closed and vice versa. This reflux flow is, however, controlled to maintain the liquid level in the accumulator; this is affected by the controller 58, which operates the valve 22. The controller 58 compares the indication of the flow meter 57 with a signal from the level controller 15 which is responsive to the level gauge 16.

Additionally several control schemes are possible in which a ratio controller is used as one of the two quality controllers. An occasion to do so will present itself if, for instance, the quality of the separation is expressed as the boiling point of that component which is distributed equally over top product and bottom product (cut point), and as the sharpness of separation (separation index). In this case a quality meter may be used for the control of the cut point and a ratio controller for the separation index.

Figure 10:
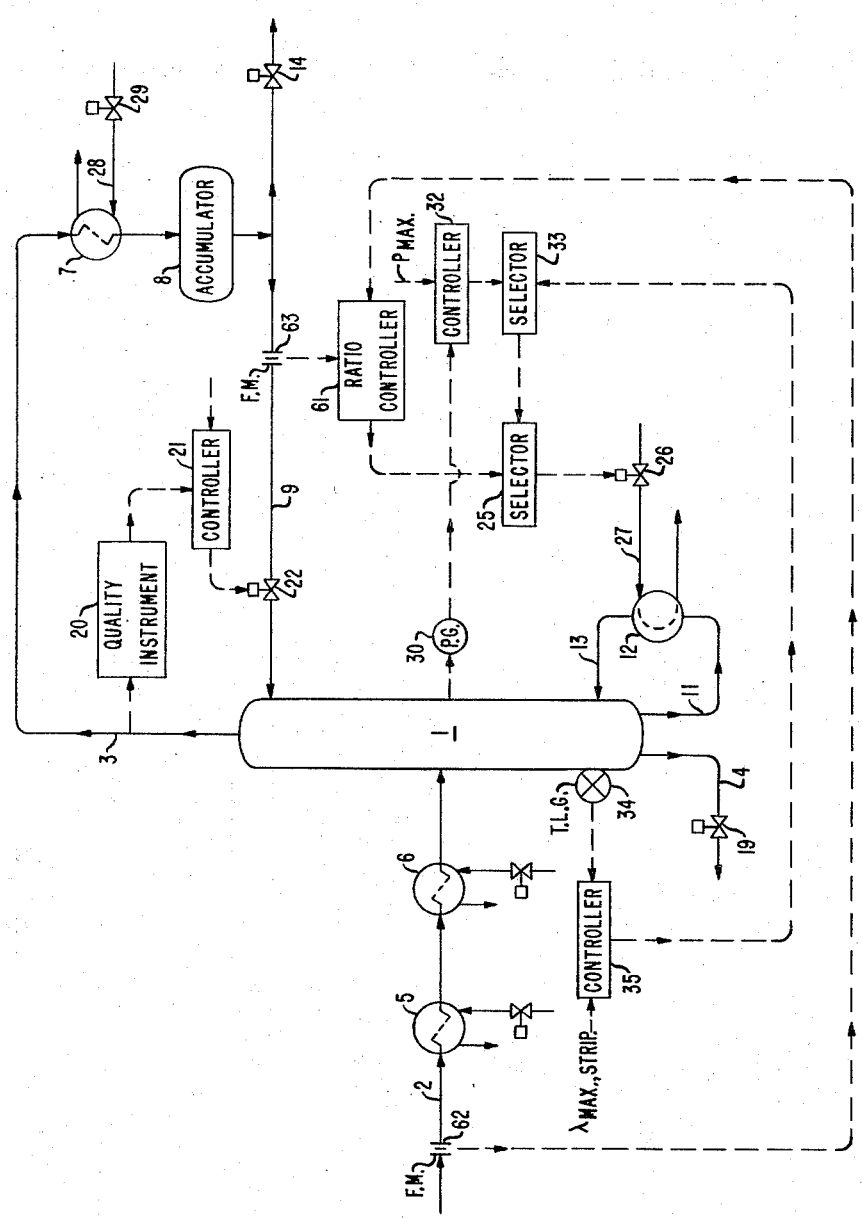
FIGURES 10 and 11 are diagrammatic representations showing variations of portions of the control schemes shown in the preceeding figures wherein ratio control is used for controlling the quality of the separation.

In FIGURE 10, a ratio controller 61 receives signals from the flow meters 62 and 63, located respectively in the feed line 2 and in the reflux line 9. The output signal from controller 61 then controls, via the control valve 26, the flow of heating medium to the reboiler 12, i.e., the degree of re-evaporation, while the controller 21 changes the reflux flow until the ratio between the feed stream flow and the reflux flow reaches the desired value.

Figure 11:
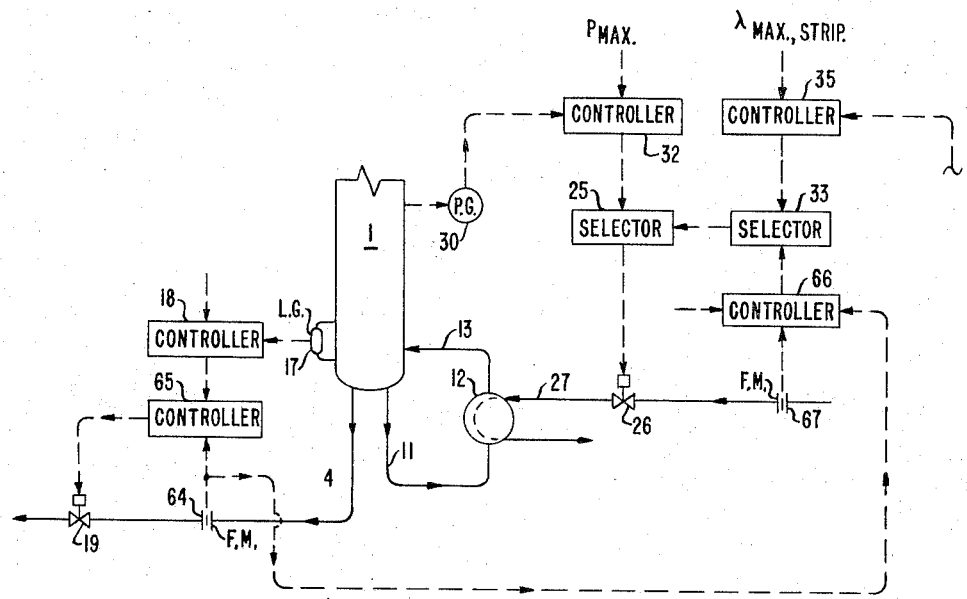

FIGURE 11 shows another modification of the control scheme utilizing ratio control. In this modification the output flow of the bottom product in the pipeline 4 and the flow of heating medium in the pipeline 27 to the reboiler 12 are utilized for the ratio control. As shown in FIGURE 11, a flow meter 64 is connected in the bottom product flow line 4. This meter supplies the signal to a controller 65 which operates the control valve 19 in the bottom product flow line 4. The set valve of the controller 65 is supplied by the column bottom level controller 18 and the level gauge 17. The flow discharge through the pipeline 4 is then adjusted by the controller 65 to maintain the level of the liquid in the bottom of the column at the desired value. The signal from flow meter 64 is also passed to a ratio controller 66 to which is also passed the output from flow meter 67 connected in the heating medium line 27 to the reboiler 12. The output signal from the controller 66 is connected, via the selectors 33 and 25 to the control valve 26 and, adjusts the control valve 26 such that the proper ratio between the flow of heating medium to the reboiler to the bottom product output flow is maintained. It should be noted that the order of the connections of the controllers to the selectors 25 and 33 in FIGURES 10 and 11 can be permuted.

A refinement of the control schemes, incorporating a ratio controller, is obtained by supplying the set value of the ratio controller via a computer, either analog or digital, which makes it possible to take account of the dependence of the desired ratio on the pressure in the column. Thus, for example at a lower pressure the reflux flow or the degree of re-evaporation can be adjusted at a relatively smaller value.

Figure 12:
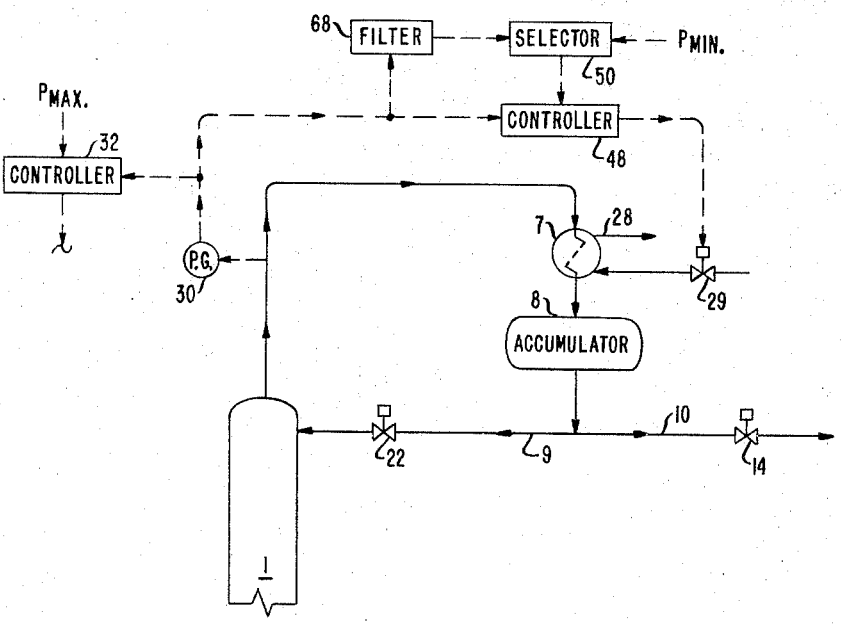
FIGURE 12 is a schematic representation of an alternative control scheme for the control schemes shown in FIGURES 6 and 7.

In some cases, it is attractive to make use of a filter which does not pass signal variations originated by rapid pressure variations, but does pass signal variations originated by slow pressure variations. A filter of this type is incorporated in FIGURE 12, resulting in an alternative scheme for the scheme shown in FIGURE 6 or FIGURE 7. As shown in FIGURE 12 the output signal from pressure gauge 30 is passed to the controller 48 and to the filter 68. Any signal fluctuation originating from a rapid pressure variation is not passed by the filter 68 to the selector 50 but reaches controller 48 unimpeded, and can, therefore, close the valve 29 if the pressure drops rapidly, or open it wider upon a rapid rise in pressure. So long as the pressure is above $P_{min}$, any signal originating from a slow pressure variation reaches the controller 48 at the same instant of time both via the filter 68 and directly via the connection between gauge 30 and controller 48. These signals arrive in the controller 48 in opposition, i.e., in such a way that they cancel each other, so that no change is made to the position of the valve 29. However, when the pressure falls below $P_{min}$, the selector 50 emits an overriding signal to move the valve 29 toward closed position.

It is understood that the quality meters mentioned hereinbefore may be direct quality meters such as chromatographic analysis apparatus, infrared or ultra-violet absorption, viscometers, refractive index meters, or flash point meters. For this purpose one may also use temperature meters compensated for pressure variations, meters for the difference in temperature between two trays, meters for the difference in vapor pressure between the product obtained and the desired product or, under certain conditions, controllers for the ratio of two flows. It is further understood that it is not necessary to connect the quality meter directly to the top product or to the bottom product discharge lines which lead from the column or to the accumulator outlet. Sometimes it may be desirable, for instance in view of the accuracy of the quality meter, to connect this meter to the mixture on a selected tray in the column having regard to the nature of the distillation process to select a stage which is effective to yield meaningful data on which control can be based; nor is it necessary that the locations of the valves 26 and 29 be as invariably indicated in the drawings. Thus, the valve 26, for instance, may alternatively be placed in the discharge line of the heating medium from the reboiler. When this medium is steam, the valve 26 should be located in the condensate discharge line. The valve 29 may be similarly located in the discharge line of the cooling medium. This valve may also be located in the line 3 or, as already indicated, in the condensed vapor line between the condenser 7 and the accumulator 8. In all cases, however, the valve 29 governs the heat transfer from vapor flow to cooling medium.

The tray loads can be measured with a meter which produces an output signal proportional to the pressure difference across one or more trays; with a heat conductivity meter in the space over the tray or with any other standard measuring system for this purpose. Furthermore, the tray loads can be calculated from process conditions utilizing, for example, an analogue computer.

It is further understood that the control systems mentioned hereinbefore may be pneumatic, hydraulic, electric, electronic or mechanical systems or may constitute a mixture of these types.

I claim as my invention:

1. In a process for the continuous distillation of a stream of an intake mixture which is carried out at superatmospheric pressure in a multi-tray distillation column having both a rectifying and a stripping section, wherein the overhead vapors from the column are condensed in a condenser and collected in an accumulator and both reflux in the upper portion and re-evaporation in the bottom portion of the column are used, and wherein the amount of reflux, the degree of re-evaporation, the top product flow and the bottom product flow are controlled such that the top product accumulator level and the bottom product level in the column are adjusted to predetermined respective levels and the desired quality of the separation is attained, the improvement comprising: allowing the pressure in the column to freely adjust itself between the maximum and minimum permissible operating pressures for the column; supplying the maximum possible quantity of cooling medium to the condenser, decreasing the supply of cooling medium when the column pressure substantially equals the minimum permissible pressure; preheating said stream of intake mixture with the maximum possible quantity of heat, decreasing the supply of preheat when the loading on the trays of the rectifying section of the column substantially equals the maximum permissible loading; and, decreasing the degree of re-evaporation whenever the maximum permissible load on the column trays of the stripping section of the distillation column is exceeded; whereby the costs of operating the distillation process are minimized when the distillation takes place in a pressure range where the tray load increases with increasing pressure and where the cost of the heating medium used for preheating is relatively cheap in comparison with the heating medium used for re-evaporation.

2. The process of claim 1 wherein the column pressure is maintained between the maximum and minimum permissible pressures for the column by: measuring the pressure in the column; decreasing the supply of cooling medium to the condenser whenever the measured pressure is below the preset value corresponding to the minimum permissible pressure; and, decreasing the degree of re-evaporation whenever the measured pressure is above the preset value corresponding to the maximum permissible column pressure.

3. The process of claim 2 wherein overloading of the trays of the rectifying section of the column is prevented by: decreasing the degree of preheating of said stream of intake mixture when the maximum permissible load on the trays of the rectifying section of the column is exceeded.

4. The process of claim 2 wherein overloading of the trays of the rectifying section is prevented by: decreasing the degree of preheating of said intake mixture when the load of the trays of said rectifying section of the column exceeds a value slightly less than the maximum permissable value for the trays; and decreasing the degree of re-evaporation whenever the maximum permissible load for the trays of the rectifying section of the column is exceeded.

5. The process of claim 3 including the step of also decreasing the degree of re-evaporation to eliminate overloading the trays of the rectifying section of the column.

6. The process of claim 5 wherein the steps of decreasing the degree of re-evaporation and decreasing the degree of preheating are performed simultaneously.

7. The process of claim 2 wherein overloading of the trays of the rectifying section is prevented by: successively decreasing the degree of preheating of said intake mixture and the degree of re-evaporation whenever the maximum permissible load for the rectifying section is exceeded.

8. The process of claim 3 including the step of: decreasing the degree of re-evaporation whenever the maximum permissible load of the trays of the rectifying section is exceeded and the degree of preheating of the intake mixture has already been reduced to a minimum value.

9. The process of claim 2 wherein the step of suppressing sudden pressure variations in the column comprises: controlling the flow of cooling medium to the condenser by a control signal proportional to the differentce between (1) a signal proportional to the measured pressure, and (2) a signal proportional to the difference between said control signal and a fixed signal the value of which corresponds to the desired control signal.

10. The process of claim 2 wherein the step of suppressing sudden pressure variations in the column comprises: producing a signal proportional to the difference between (1) a signal proportional to the measured accumulator level and (2) a preset value equal to an almost minimum value of the measured accumulator level; and controlling the condensed vapor flow between the condenser and the accumulator in accordance with the difference between (1) a signal proportional to the pressure in the column and (2) said first mentioned difference signal.

11. The process of claim 2 wherein the step of suppressing sudden pressure variations in the column comprises: producing a signal proportional to the difference between (1) a signal proportional to the rate of pressure variation in the column and (2) a signal proportional to the difference between a signal proportional to the pressure in the column and a signal proportional to the minimum permissible column pressure; and, controlling the quantity of cooling medium supplied to the condenser in accordance with said control signal.

12. In an apparatus for the continuous distillation of a stream of intake mixture at superatmospheric pressure in a multi-tray distillation column having both a rectifying and a stripping section, and utilizing both reflux in the upper portion and re-evaporation in the lower portion of the column and wherein: a condenser and an accumulator are connected to the distillation column to collect the top product, a reflux line connects said accumulator to said column, a reboiler is connected to the bottom portion of the distillation column, a first valve disposed in the reflux line for controlling the amount of reflux, a second valve means disposed in the connection between the reboiler and the column to control the degree of re-evaporation and third and fourth valve means to control, the top product flow and the bottom product flow such that the desired quality of separation in the column is attained, a fifth valve means to control the amount of cooling medium supplied to the condenser; the improvement comprising: pressure-measuring means for measuring the pressure within said column; a first controller responsive to the output of said pressure-measuring means for the second valve means to control the amount of heat supplied to said reboiler and position the fifth valve means to control the amount of cooling medium supplied to said condenser to maintain the pressure in said column between the maximum and minimum permissible column operating pressures, said first controller including means for maintaining the maximum supply of cooling medium to said condenser which will maintain the pressure in the column above the minimum permissible column operating pressure; a preheater for preheating the intake mixture, said preheater being connected to said column; a sixth valve means disposed to control the heating medium supplied to said preheater; a first tray load gauge means for measuring the load on the trays in the rectifying section of said distillation column; heating means for heating said stream of intake mixture; a second controller responsive to the output of said first tray load gauge means for positioning said sixth valve means to supply the maximum quantity of heat to said intake mixture which maintains the load on said rectifying section trays at a value which does not exceed the maximum permissible load for said trays; second tray load gauge means for measuring the load on the trays of said stripping section of said column; and, a third controller responsive to the output of said second tray load gauge means for positioning said second valve means to decrease the supply of heating medium to said reboiler whenever the maximum permissible load on said stripping section trays is exceeded.

References Cited

UNITED STATES PATENTS

| | | | |
|---|---|---|---|
| 2,489,949 | 11/1949 | Blair | 196—132 |
| 2,816,858 | 12/1957 | Walker | 203—2 |
| 2,910,521 | 10/1959 | Cobb | 203—2 |
| 2,915,462 | 12/1959 | Salmon | 203—2 |
| 3,034,307 | 5/1962 | Berger | 62—37 |
| 3,071,520 | 1/1963 | Smalling | 202—160 |
| 3,139,391 | 6/1964 | Walker | 203—2 |
| 3,249,519 | 5/1966 | Cabbage et al. | 203—2 |

WILBUR L. BASCOMB, JR., *Primary Examiner.*